US007140814B2

(12) United States Patent
Singh et al.

(10) Patent No.: US 7,140,814 B2
(45) Date of Patent: Nov. 28, 2006

(54) SPADE-TYPE DRILL BIT HAVING HELICAL CONFIGURATION

(75) Inventors: Iqbal Singh, Buffalo Grove, IL (US); Kornel Ehmann, Evanston, IL (US)

(73) Assignee: Irwin Industrial Tool Company, Huntersville, NC (US)

( * ) Notice: Subject to any disclaimer, the term of this patent is extended or adjusted under 35 U.S.C. 154(b) by 291 days.

(21) Appl. No.: 10/427,393

(22) Filed: Apr. 30, 2003

(65) Prior Publication Data

US 2004/0052594 A1 Mar. 18, 2004

Related U.S. Application Data

(60) Provisional application No. 60/376,577, filed on Apr. 30, 2002.

(51) Int. Cl.
*B23B 51/00* (2006.01)

(52) U.S. Cl. ........................ 408/211; 408/225; 408/213

(58) Field of Classification Search ................ 408/1 R, 408/211, 212, 213, 225, 227, 228, 230
See application file for complete search history.

(56) References Cited

U.S. PATENT DOCUMENTS 124,089 A 2/1872 Shepardson
131,946 A 10/1872 Ford
146,344 A 1/1874 Ladd et al.
356,138 A 1/1887 Knight
764,664 A 7/1904 Jones
1,047,466 A 12/1912 Wagner
1,056,670 A 3/1913 Hayden
1,275,889 A 8/1918 Flander
1,398,780 A 11/1921 Hayden
1,415,317 A 5/1922 Crawford et al.
1,499,584 A 7/1924 Litchfield
2,230,645 A * 2/1941 Jones ......................... 408/212
2,593,823 A 4/1952 Wilson
2,618,304 A 11/1952 Wilson
2,621,548 A 12/1952 Williams ....................... 77/58
2,627,292 A * 2/1953 Konstantin .................. 408/213
2,652,083 A * 9/1953 Emmons ..................... 408/211
2,681,673 A 6/1954 Mackey
2,689,131 A 9/1954 Priest
2,692,627 A 10/1954 Stearns ....................... 145/116
2,752,965 A 7/1956 Mackey (Continued)

FOREIGN PATENT DOCUMENTS

FR 2617753 * 1/1989

(Continued)

OTHER PUBLICATIONS

Tool and Manufacturing Engineers Handbook, Fourth Edition, vol. 1, Machining, Society of Manufacturing Engineers, Thomas J. Drozda, Editor in chief, 1983, chapter 9, pp. 14-15.*

(Continued)

*Primary Examiner*—Daniel W. Howell
(74) *Attorney, Agent, or Firm*—Dennis J. Williamson; Moore and Van Allen, PLLC

(57) ABSTRACT

A spade bit including a longitudinally extending shaft having a cutting member located at a distal end thereof. The cutting member comprises a pair of helically shaped, opposed blades joined along the longitudinal axis of the shaft and an axially extending pilot spur. The pilot spur defines a pair of cutting edges, and each of the blades defines a forward cutting edge joined with a respective cutting edge of the pilot spur.

26 Claims, 4 Drawing Sheets

U.S. PATENT DOCUMENTS

| | | | | | |
|---|---|---|---|---|---|
| 2,794,468 | A | | 6/1957 | Huxtable | |
| 2,812,791 | A | | 11/1957 | Mackey | |
| 2,883,888 | A | | 4/1959 | Stewart | |
| 2,934,113 | A | | 4/1960 | Hollien | |
| 3,027,953 | A | | 4/1962 | Coski | |
| 3,042,126 | A | | 7/1962 | Craig | |
| 3,333,489 | A | | 8/1967 | Mossberg | |
| 3,834,090 | A | | 9/1974 | Wasser | 51/288 |
| 3,920,350 | A | * | 11/1975 | Southall | 408/211 |
| 3,966,350 | A | | 6/1976 | Benjamin | 408/233 |
| 4,012,970 | A | | 3/1977 | Hintz et al. | 76/102 |
| 4,033,703 | A | | 7/1977 | Slater | 408/211 |
| 4,043,698 | A | | 8/1977 | Chelberg | 408/201 |
| 4,047,826 | A | | 9/1977 | Bennett | 408/59 |
| 4,050,841 | A | | 9/1977 | Hildebrandt | 408/213 |
| 4,060,335 | A | | 11/1977 | Holloway et al. | 408/233 |
| 4,066,379 | A | | 1/1978 | Prohaska | 408/125 |
| 4,078,621 | A | | 3/1978 | Dewar et al. | 175/394 |
| 4,134,706 | A | | 1/1979 | Stewart | 408/213 |
| 4,160,616 | A | | 7/1979 | Winblad | 408/144 |
| 4,286,904 | A | | 9/1981 | Porter et al. | 408/225 |
| 4,313,506 | A | | 2/1982 | O'Connell | 175/410 |
| 4,480,951 | A | | 11/1984 | Regensburger | 408/224 |
| 4,527,449 | A | | 7/1985 | Sydlowski et al. | 76/108 |
| 4,533,004 | A | | 8/1985 | Ecer | 175/329 |
| 4,561,813 | A | * | 12/1985 | Schneider | 408/230 |
| 4,595,322 | A | | 6/1986 | Clement | 408/230 |
| 4,682,917 | A | * | 7/1987 | Williams et al. | 408/212 |
| 4,744,704 | A | | 5/1988 | Galvefors | 408/144 |
| 4,759,667 | A | * | 7/1988 | Brown | 408/230 |
| 4,940,099 | A | | 7/1990 | Deane et al. | 175/374 |
| 4,950,108 | A | | 8/1990 | Roos | 408/59 |
| 4,984,943 | A | | 1/1991 | Hamilton | 408/144 |
| 5,000,630 | A | | 3/1991 | Riley et al. | 408/228 |
| 5,046,905 | A | * | 9/1991 | Piacenti et al. | 411/387.2 |
| 5,070,952 | A | * | 12/1991 | Neff | 175/426 |
| 5,074,356 | A | * | 12/1991 | Neff | 166/55.7 |
| 5,092,719 | A | | 3/1992 | Zsiger | 408/213 |
| 5,099,933 | A | | 3/1992 | Schimke et al. | 175/385 |
| 5,111,895 | A | | 5/1992 | Griffin | 175/425 |
| 5,137,398 | A | | 8/1992 | Omori et al. | 408/145 |
| 5,145,018 | A | | 9/1992 | Schimke et al. | 175/382 |
| 5,148,880 | A | | 9/1992 | Lee et al. | 175/393 |
| 5,193,951 | A | | 3/1993 | Schimke | 408/233 |
| 5,195,403 | A | | 3/1993 | Sani et al. | 76/108.6 |
| 5,221,166 | A | | 6/1993 | Bothum | 408/212 |
| 5,291,806 | A | | 3/1994 | Bothum | 76/102 |
| 5,433,561 | A | | 7/1995 | Schimke | 408/211 |
| 5,452,970 | A | * | 9/1995 | Sundstrom et al. | 408/211 |
| 5,458,211 | A | | 10/1995 | Dennis et al. | 175/428 |
| 5,464,068 | A | | 11/1995 | Najafi-Sani | 175/374 |
| 5,486,072 | A | | 1/1996 | Green | 407/32 |
| 5,570,978 | A | | 11/1996 | Rees et al. | 408/144 |
| 5,630,478 | A | | 5/1997 | Schimke | 175/420 |
| 5,697,738 | A | | 12/1997 | Stone et al. | 408/225 |
| 5,700,113 | A | | 12/1997 | Stone et al. | 408/1 R |
| 5,735,648 | A | | 4/1998 | Kleine | 408/144 |
| 5,791,421 | A | | 8/1998 | Lin | 175/371 |
| 5,797,711 | A | * | 8/1998 | Mulgrave et al. | 408/226 |
| 5,810,517 | A | * | 9/1998 | Bostic | 407/53 |
| 5,836,409 | A | | 11/1998 | Vail, III | 175/379 |
| 6,026,918 | A | | 2/2000 | Briese | 175/414 |
| 6,116,360 | A | | 9/2000 | Evans | 175/371 |
| 6,174,111 | B1 | | 1/2001 | Anjanappa et al. | 408/1 R |
| 6,224,302 | B1 | | 5/2001 | Cole | 408/224 |
| 6,227,774 | B1 | | 5/2001 | Haughton et al. | 408/225 |
| 6,290,439 | B1 | | 9/2001 | Bludis et al. | 408/224 |
| 6,361,255 | B1 | * | 3/2002 | Schmotzer | 408/1 R |
| 6,402,438 | B1 | | 6/2002 | Boyer | 408/144 |
| 6,402,439 | B1 | | 6/2002 | Puide et al. | 408/144 |
| 6,454,028 | B1 | | 9/2002 | Evans | 175/379 |
| 6,499,919 | B1 | | 12/2002 | Feld | 408/213 |
| 6,524,034 | B1 | | 2/2003 | Eng et al. | 408/59 |
| 6,857,832 | B1 | * | 2/2005 | Nygård | 408/211 |
| 2002/0127071 | A1 | * | 9/2002 | Vasudeva | 408/213 |
| 2003/0233923 | A1 | * | 12/2003 | Wang | 83/669 |
| 2005/0053439 | A1 | * | 3/2005 | Wang et al. | 408/230 |

FOREIGN PATENT DOCUMENTS

| | | | |
|---|---|---|---|
| GB | 193786 | * | 1/1923 |
| GB | 194542 | * | 3/1923 |
| GB | 2130935 | * | 6/1984 |

OTHER PUBLICATIONS

International Search Report issued Aug. 19, 2003 for PCT application No. US03/13632, pp. 1-5.

Zhao, Hanxin, "Geometry and Mechanics of Spade Drilling Operations", Dissertation comparing and analyzing different commercial bits, pp. 17-21, 27, 29, 44-46, 48-57, 122, 178, 188-185, 206-216.

* cited by examiner

SPADE-TYPE DRILL BIT HAVING HELICAL CONFIGURATION

CROSS-REFERENCE TO RELATED APPLICATION

The present application claims the benefit of U.S. Provisional Application Ser. No. 60/376,577, entitled SPADE-TYPE DRILL BIT HAVING HELICAL CONFIGURATION, filed Apr. 30, 2002, the entirety of which is incorporated herein.

BACKGROUND OF THE INVENTION

The present invention relates generally to tools such as drill bits. More particularly, the present invention relates to spade-type drill bits for boring holes.

Various rotary tools may be used to bore holes of preselected diameters into workpieces. For example, holes may be formed in wood using twist drills, fluted drills, screw augers, rotary rasps and the like. Paddle, or "spade" bits, are typically utilized with power drills and generally comprise an elongated shaft having a chuck-mounting end and a cutting member. The cutting member is formed into a generally flat shape having generally planar vanes extending radially outwardly from the shaft. The bottoms or distal ends of the vanes are formed into cutting edges for engaging the workpiece, and the central area between the vanes is typically formed with a pilot point extending along the axis of the shaft. These types of spade bits have been successful in the marketplace because they are effective in operation, relatively simple and inexpensive to manufacture, and easy to sharpen.

The machining of the cutting edges at the bottom of the planar vanes typically involves an expensive and additional machining step to form radially extending flutes in the edges of the vanes. The formation of these flutes adds complexity to the manufacturing process and additional expense to the cost of the bits.

Spade bits are typically available in a variety of sizes and shape configurations having various performance characteristics. In most configurations, the cutting member is planar and flat. In order to improve cutting characteristics in these types of bits, a pair of axially extending spurs are often formed on the outer edges of the cutting member. The spurs score or scribe the general outer dimensions of the hole into the workpiece during the boring process to further center and stabilize the bit and allow for a cleaner edge to the finished hole. The spurs have shortcomings, however, in that the spurs bear significant stress during the boring operation and are particularly susceptible to breakage. Furthermore, irregularities in the workpiece or friction may cause the spurs to become stuck in the workpiece, thereby stopping the boring operation suddenly.

Other cutting member shapes have also been developed, including cutting members having tip portions that are angled slightly to present a less aggressive cutting edge to the surface of the workpiece. While such shapes have been improvements to performance, shortcomings such as breakage and sticking in the workpiece are still present. Furthermore, the boring waste, or chip swarf, is not efficiently eliminated from the hole during the boring operation.

There is therefore a need for an improved spade bit that may be used to more efficiently bore holes in a workpiece.

BRIEF SUMMARY OF THE INVENTION

In accordance with the present invention, a spade bit is provided that improves over the prior art by implementing a structure of helical blade portions that are twisted around a longitudinal axis of the bit.

Accordingly, in one aspect of the invention, a spade bit is provided including a longitudinally extending shaft having a cutting member located at a distal end thereof. The cutting member comprises a pair of helically shaped, opposed blades joined along the longitudinal axis of the shaft with an axially extending pilot spur. The pilot spur defines a pair of cutting edges, and each of the blades defines a forward cutting edge joined with a respective cutting edge of the pilot spur.

In another aspect of the invention, a spade bit is provided that includes a shaft, a pilot spur and a cutting member. The cutting member is mounted to the shaft and includes opposing faces and outer edges, and defines a pair of opposed blades extending helically about at least a circumferential portion of the shaft. The blades each define a forward cutting edge and a scribing corner.

In yet another aspect of the invention, the spade bit includes a pair of blades defined on and extending along a shaft, and each of the blades are twisted helically around at least a circumferential portion of the shaft and are joined to each other via the shaft. The forward edge of each of the blades forms a generally straight cutting edge. The helical configuration of the blades are adapted to eject chip swarf axially outwardly from the bore during a boring operation.

In yet another aspect of the invention, a method of boring a hole in a workpiece is provided. The method includes the steps of providing a rotary power tool having a chuck, and attaching a spade bit having a cutting end and a mounting end to the power tool by receiving the mounting end within the chuck. The spade bit comprises a longitudinally extending shaft having a cutting member located at a distal end thereof. The cutting member comprises a pair of helically shaped, opposed blades joined along the longitudinal axis of the shaft and an axially extending pilot spur. The pilot spur defines a pair of cutting edges and each of the blades defines a forward cutting edge joined with a respective cutting edge of the pilot spur. The pilot spur is then driven into the workpiece by rotating the bit with the rotary power tool, thereby engaging the cutting edges with the workpiece. Chip swarf produced by the cutting edges is ejected from the workpiece by advancing the swarf generally out of the hole by generally axially advancing the swarf on the helically shaped blades.

The uniquely shaped blade portions provide improved aggressive cutting edges for contact with the workpiece without the necessity for forming fluted cutting edges at the shoulders of the blade. Furthermore, chip swarf is efficiently and cleanly ejected from the workpiece during the boring operation. Furthermore, the helical shape of the blades does not require the use of longitudinally extending spurs to effectively scribe the workpiece.

It is to be understood that both the foregoing general description and the following detailed description are exemplary and explanatory and are intended to provide further explanation of the invention as claimed. The invention, together with further objects and attendant advantages, will best be understood by reference to the following detailed description, taken in conjunction with the accompanying drawings.

BRIEF DESCRIPTION OF THE INVENTION

Figure 1:
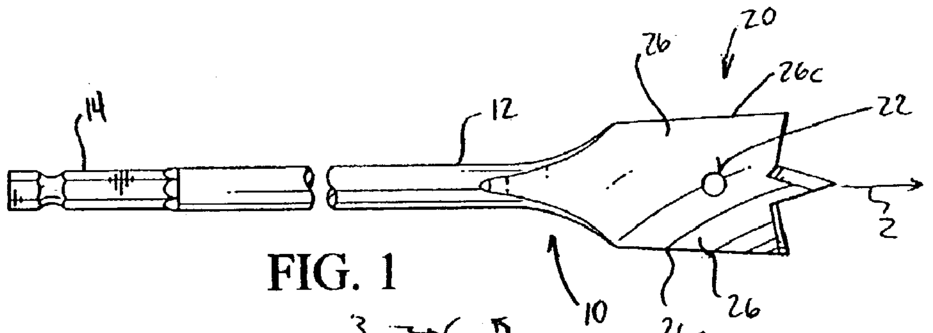
FIG. 1 is a side view of a spade bit embodying the present invention.

Referring now to FIG. 1 which illustrates a spade bit 10 in accordance with the present invention, the bit 10 includes an elongated longitudinally extending cylindrical shaft 12, defining at its upper end a contoured mounting end 14 adapted to be received in a chuck or other power tool and terminating at its distal end in tapered cutting member 20. The cutting member 20, or spade, is formed on the distal end of the shaft 12, and may be forged integrally from the same piece as the shaft 12. The cutting member 20 may include an opening 22 defined on or near the center of the longitudinal axis of the shaft 12 to facilitate the hanging of the bit 10 from a hook or nail for sale or storage of the bit.

Figure 2:
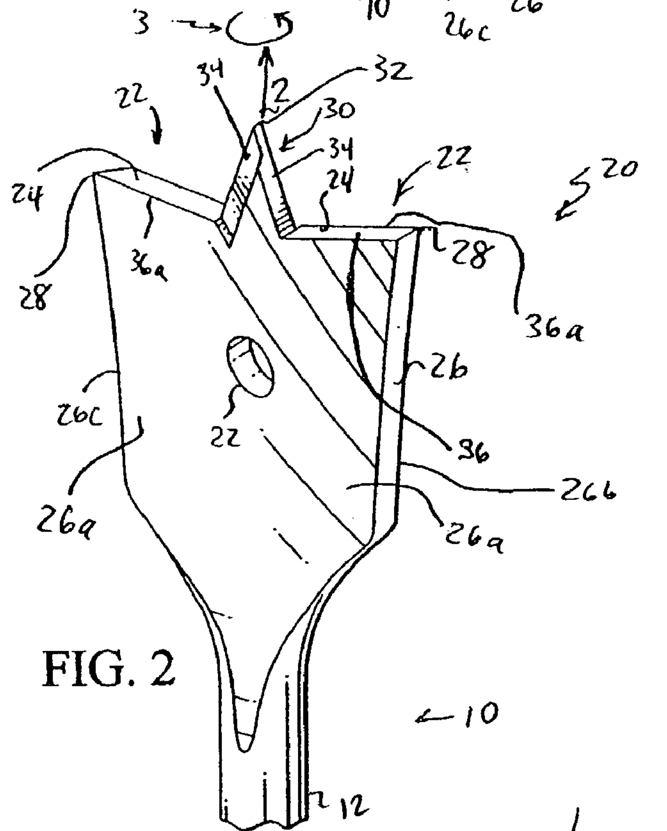
FIG. 2 is a perspective view of the cutting member of the embodiment of FIG. 1.
Figure 3:
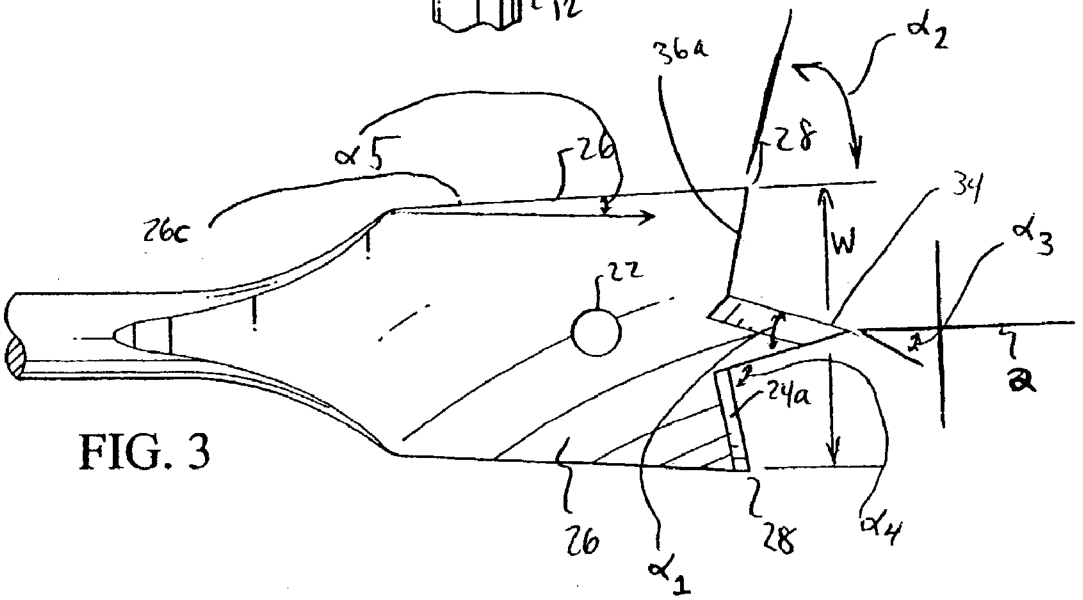
FIG. 3 is a side view of the cutting member of FIG. 2.
Figure 4:
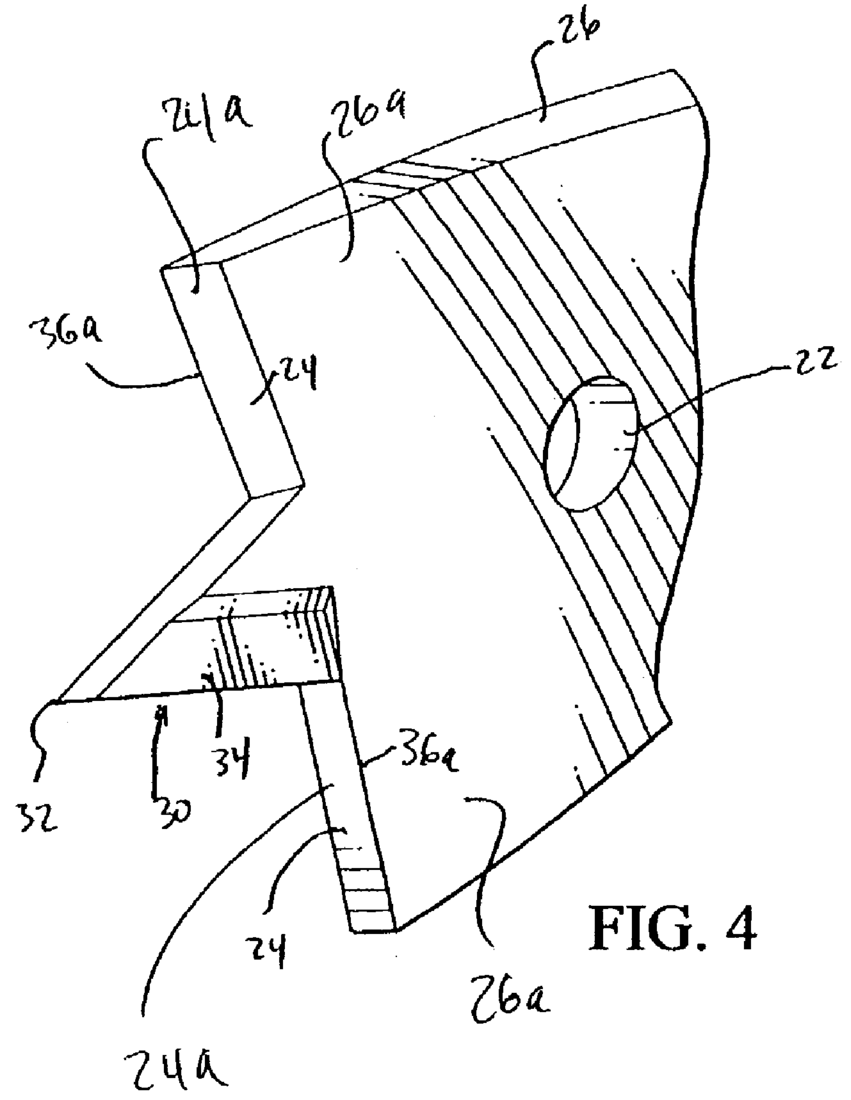
FIG. 4 is a perspective view of the top edge portion of the cutting member shown in FIG. 2.
Figure 5:
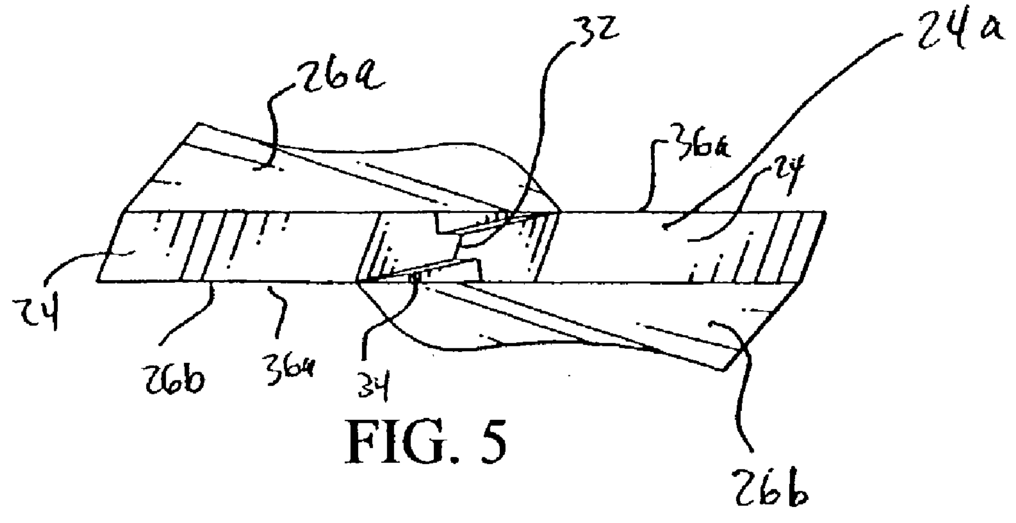
FIG. 5 is a top view of the embodiment of FIGS. 1–4.

As shown in FIGS. 2 and 3, the cutting member 20 defines a pair of helically shaped, opposed blades 26 extending radially outwardly from the axis 2 of the shaft 12. The opposed blades 26 are joined along the longitudinal axis 2, and form opposing helixes extending partially around a portion of the shaft 12. Each blade 26 includes radial shoulders 24 and an outer edge **26*c* which meet at the outmost point of each blade 26 to form a scribing corner 28** on each blade.

The radial shoulders 24 merge with a longitudinally extending pilot spur 30 which is generally triangularly shaped and is of generally conventional design. The pilot spur includes a base positioned between the shoulders 24. In particular, the pilot spur preferably includes a point 32 and a pair of straight beveled edges 34 that extend upwardly therefrom towards the shoulders 24 of the cutting member and forming acute angles with a radial line through the shaft 12. In a preferred embodiment, the apex or point of the pilot spur 30 defines an included angle $\alpha_1$ of 24°, other angles, for example within the range of 15°–35° can also be defined. Defined relative to the longitudinal axis 2, the angle $\alpha_3$ shown in FIG. 3 of the pilot spur 30 may be within the range of 5°–20°. The relief angle of the beveled edges 34 preferably is defined within the range of 15–45 degrees.

Each blade 26 is preferably flat and of thin form relative to the contour of the cylindrical shaft 12. Each blade 26 preferably is partially defined by a pair of helically extending faces **26*a* and 26*b* which both extend around a portion of the axis 2 of the shaft 12. Thus, each face 26*a* and 26*b* of each blade 26 is nonplanar and defines a "twist" through substantially its entire extent. This degree of twist is shown more clearly in FIGS. 4–8. The twisted blade portions exhibit a marked improvement over the prior art because they allow for the rapid and efficient ejection of chip swarf from the boring operation within the work piece. Chip swarf is ejected by being lifted out of the hole during rotation of the bit 10 and is lifted continuously through the helical surfaces of the blades 26**.

The dimensions of twist vary depending on the width size W of each spade.

Each outer edge **26*c* of each blade 26 preferably tapers slightly inwardly between the scribing corner 28 and the shaft 12. Preferably, this "back taper" measures a maximum angle of 15 degrees relative to the longitudinal axis 2. This taper allows the bit to move more freely within the formed bore in the workpiece during the boring operation. Defined also as the relief angle $\alpha_5$ shown in FIG. 3**, this relief angle $\alpha_5$ may also fall within the range of 1.0 to 15 degrees.

Figure 6:
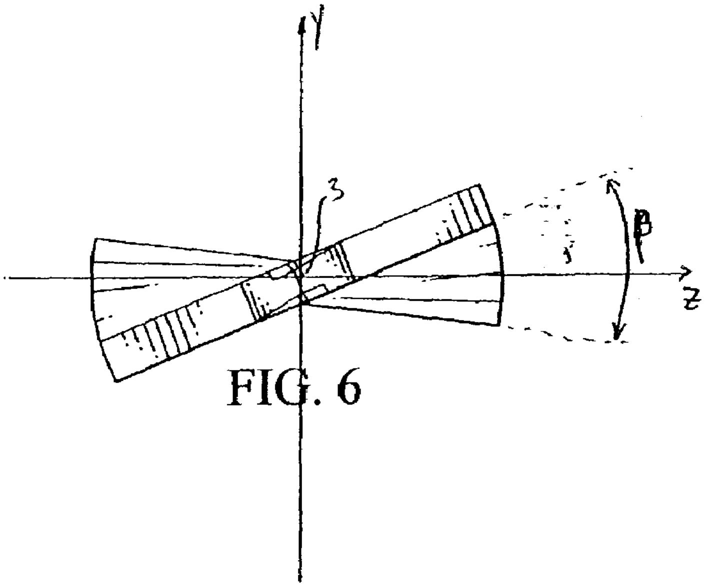
FIG. 6 is a top view of a portion of the cutting member of FIG. 2.
Figure 8:
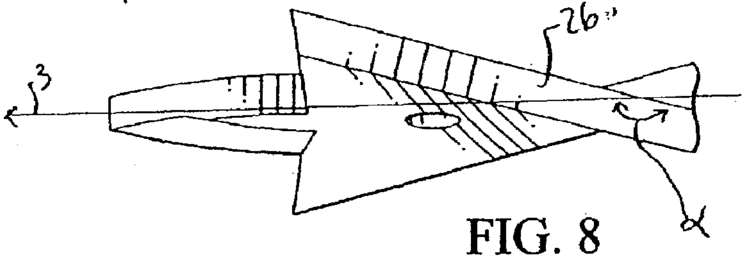
FIG. 8 is a side view of a portion of the cutting member of FIG. 2.
Figure 7:
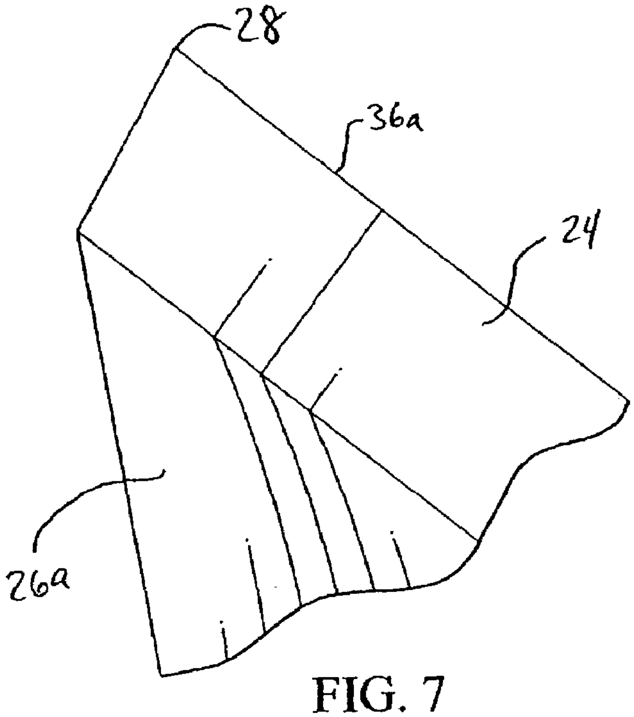
FIG. 7 is an enlarged perspective view of a portion of the cutting member of FIG. 2.

FIGS. 6 and 8 show the helical twist of the blade portions 22 relative to defined axes. In FIG. 6, a top view of a portion of the bit is shown relative to the longitudinal axis 2 and the X and Z axes shown in the Figure. In the preferred embodiment, angle $\beta$ extends approximately 40 degrees in arc as shown, thereby turning each surface **26*a* around the shaft 12 40 degrees of arc. This measurement is shown for a preferred embodiment of the bit 10** sized for a one-inch width bore. The arc measurements of angle B will preferably not be as aggressive for smaller bores, such as 0.5 inches.

FIG. 8 shows the helix angle $\alpha$ of the bit relative to the longitudinal axis 2 as shown. In the preferred embodiment, the angle $\alpha$ is 165 degrees defined between the side edge **26*b* and a plane extending through the longitudinal axis 2 horizontally. Again, these measurements will vary depending on the size of the bit 10**. The helix preferably forms an angle of attack with the workpiece of $\gamma$. In the preferred embodiment, angle $\gamma$ is approximately 75 degrees.

The radial shoulders 24 of the blades 26 generally extend outwardly from the base of each edge 34 away from the longitudinal axis 2. Each shoulder 24 is preferably defined as a substantially straight edge. Preferably, these shoulders are directly slightly downwardly toward the scribing corners 28 so that the shoulders 24 are not extending perpendicularly to the axis 2. This eliminates the need for conventional axially extending spurs for scribing a bore in the workpiece. This angle is shown as angle $\alpha_2$ in FIG. 3. In the preferred embodiment, this angle $\alpha_2$ may be defined preferably to be less than 90°, and the included angle between the shoulders 24 is preferably less than 180°. The included angle $\alpha_4$ between the edge **36*a* and pilot spur edge 34** is preferably within the range of 70°–110°. However, radially perpendicular shoulders may also be used without departing from the scope of the invention herein.

Each shoulder 24 preferably includes a beveled surface **24*a* that defines a cutting edge 36*a* relative to the helical face portion of each blade. In the preferred embodiment, the relief angle of the beveled surface 24*a* is within the range of 5°–30°. Each edge 36 is thus defined so that an acute angle contacts the work piece before other portions of each shoulder. In the preferred embodiment, the bit 10 is turned in the rotary direction shown by arrow 3. Each cutting edge 36*a* preferably merges with the beveled cutting edge 34 on the pilot spur 30**.

The cutting edges **36*a* formed in the shoulder 24 of each blade 26 allow the spade bit 10 to achieve a chisel-like cutting action into the work piece and allow angled entry of the edge 36*a* into the work piece. Chip swarf is "curled" upwardly onto the blade surface 26*a* for lifting out of the hole that is being formed by the boring operation. The degree of bevel of the cutting edge 36 defines a rake angle at the radially outward portion of the cutting edge 36***a*. In the present embodiments, the preferred rake angle is less than the helix angle of attack.

Figure 9:
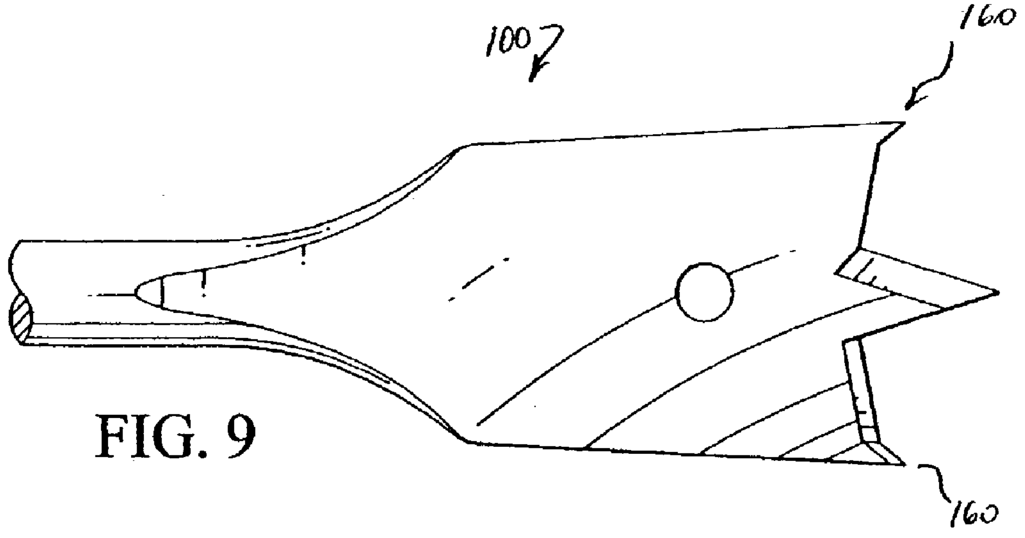
FIG. 9 is a side view similar to the view of FIG. 3 in accordance with the second embodiment of the present invention.
Figure 10:
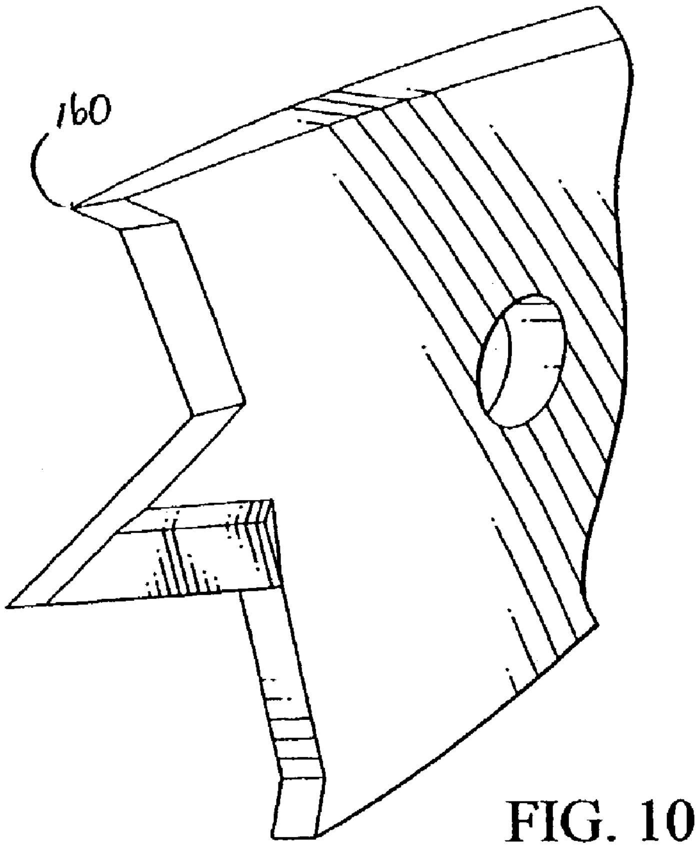
FIG. 10 is a perspective view similar to FIG. 4 showing a portion of the second embodiment of FIG. 9.

A second embodiment of the bit in accordance with the present invention is shown in FIGS. 9 and 10. As shown, a pair of spurs 160 may extend outwardly from the bottom of the cutting member 100. This will allow for improved scribing of the bore and increased precision of the bit during the boring operation.

The bits of the preferred embodiments disclosed above may be utilized as follows. The bit 10 may be connected to a conventional rotary power tool by inserting the mounting end 14 into the chuck of the drill. When the drill is turned on, the bit 20 may be applied to the work piece by pressing the pilot spur 30 to the center of the area where the bore is desired. The bit is then rotated by applying power to the drill and downward pressure towards the work piece. As this occurs, the spur will be driven into the work piece and the edges 36*a* will engage the workpiece as the bit 10 is advanced. As chip swarf is curled from the edges 36*a* during the boring operation, the swarf is ejected out of the hole efficiently by the helical shape of the blade surfaces 26*a* and 26*b*.

The embodiments shown in the present invention are to be considered as illustrative and not restrictive, and the invention is not to be limited to the details given herein, but may be modified within the scope of the following claims.

The invention claimed is:

1. A spade bit comprising:

a longitudinally extending shaft having a cutting member located at a distal end thereof, said cutting member comprising a pair of helically shaped, opposed blades joined along the longitudinal axis of said shaft, said opposed blades extending around the shaft in an arc and an axially extending pilot spur, said pilot spur defining a pair of cutting edges and each of said blades defining a forward cutting edge, the angle between one of the pair of cutting edges and the longitudinal axis being between approximately 5 and 20 degrees and the angle between the forward cutting edge and one of the pair of cutting edges being between approximately 70 and 110 degrees.

2. The spade bit of claim 1 wherein said blades are generally flat.

3. The spade bit of claim 1 wherein said opposed blades each have a generally straight outer edge that is angled relative to said axis.

4. The spade bit of claim 3 wherein said opposed blades each have a generally straight outer edge that increases in radial distance from said longitudinal shaft at points approaching said cutting edges of said blades.

5. The spade bit of claim 3 wherein said cutting edges of said blades are offset from a centerline defined through the center of the longitudinal axis of said shaft.

6. The spade bit of claim 3 wherein portions of said blades exclusive of said cutting edges are aligned along centerlines defined through the center of the longitudinal axis of said shaft.

7. The spade bit of claim 3 wherein said forward cutting edges of said blades extend in an angled direction axially rearwardly from the outer edges of said blades towards said pilot spur.

8. The spade bit of claim 1 further comprising a spur extending from each of said blades adjacent said outer edges and said forward cutting edges.

9. The spade bit of claim 1 wherein each of said opposed blades extends helically less than 90 degrees about said shaft.

10. A spade bit comprising:

a shaft having a longitudinal axis;

a pilot spur extending generally axially from said shaft and defining a pair of cutting edges; and a cutting member mounted to said shaft having opposing faces and outer edges, said cutting member defining a pair of opposed blades extending helically about at least a circumferential portion of said shaft, said opposed blades defining a helix angle of approximately 165 degrees relative to the longitudinal axis, said blades each defining a forward cutting edge that is inclined relative to a radial line through said shaft.

11. The spade bit of claim 10 wherein said forward cutting edges connect with said cutting edges of said pilot spur.

12. The spade bit of claim 11 wherein the included angle between the pair of cutting edges of said pilot spur is between 15 degrees and 35 degrees.

13. The spade bit of claim 12 wherein the relief angle of each forward cutting edge is between 15 and 45 degrees.

14. The spade bit of claim 13 wherein each forward cutting edge defines a scribing corner with an outer edge of each blade, said scribing corner defining an angle of less than 90 degrees.

15. The spade bit of claim 14 wherein each scribing corner defines a triangular spur extending outwardly from each blade.

16. The spade bit of claim 10 wherein said forward cutting edges define an included angle of less than 180 degrees.

17. The spade bit of claim 10 wherein each of said opposed blades extends helically less than 90 degrees about said shaft.

18. A spade bit for mounting to a power drill apparatus, said spade bit comprising:

a shaft having a chuck mounting end and a cutting end;

a pair of blades defined on an extending along said shaft at said cutting end, each of said blades being twisted helically around at least a circumferential portion of said shaft approximately 40 degrees and joined to each other via said shaft, the forward edge of each of said blades forming a generally straight cutting edge inclined relative to a radial line through said shaft;

said helical configuration of said blades being adapted to eject chip swarf axially outwardly from said bore during a boring operation.

19. The spade bit of claim 18 wherein said cutting edge on each of said blades extends at an oblique angle to a plane defined perpendicularly to said shaft.

20. The spade bit of claim 18 wherein each of said blades includes a generally straight outer edge that extends at an angle to the longitudinal axis of said shaft.

21. The spade bit of claim 20 wherein said angle relative to said longitudinal axis is between 1 and 15 degrees.

22. The spade bit of claim 18 further comprising a pilot spur extending from said shaft and defining a pair of pilot cutting edges wherein the included angle between the pair of pilot cutting edges of said pilot spur is between 15 degrees and 35 degrees.

23. The spade bit of claim 22 wherein the relief angle of each forward edge is between 15 and 45 degrees.

24. The spade bit of claim 23 wherein each forward edge defines a scribing corner with an outer edge of the blade, said scribing corner defining an angle of less than 90 degrees.

25. The spade bit of claim 20 wherein said outer edge extends away from said longitudinal axis and joins with said cutting edge to form a scribing corner at the intersection between said distal edge and said cutting edge, said scribing corner defining an angle between said edges of less than 90 degrees.

26. A spade bit comprising:

a longitudinally extending shaft having a cutting member located at a distal end thereof, said cutting member comprising a pair of opposed blades joined along the longitudinal axis of said shaft, said opposed blades each having a helically shaped face extending around the shaft such that each face is helically shaped for the entire extent thereof and an axially extending pilot spur, said pilot spur defining a pair of cutting edges and each of said blades defining a forward cutting edge.

* * * * *